United States Patent [19]
Ducaroir et al.

[11] Patent Number: 6,167,077
[45] Date of Patent: Dec. 26, 2000

[54] USING MULTIPLE HIGH SPEED SERIAL LINES TO TRANSMIT HIGH DATA RATES WHILE COMPENSATING FOR OVERALL SKEW

[75] Inventors: Francois Ducaroir, Santa Clara; Karl S. Nakamura, Palo Alto; Michael O. Jenkins, San Jose, all of Calif.

[73] Assignee: LSI Logic Corporation, Milpitas, Calif.

[21] Appl. No.: 08/996,970

[22] Filed: Dec. 23, 1997

[51] Int. Cl.$^7$ ...................................................... H04B 1/38
[52] U.S. Cl. ........................ 375/219; 375/220; 375/221; 375/347; 370/476
[58] Field of Search .................................. 375/219, 347, 375/221, 220; 370/476; 709/231; 710/71; 371/47.1

[56] References Cited

U.S. PATENT DOCUMENTS

| | | | |
|---|---|---|---|
| 4,486,739 | 12/1984 | Franaszek et al. | 341/59 |
| 5,414,830 | 5/1995 | Marbot | 710/71 |
| 5,570,356 | 10/1996 | Finney et al. | 370/476 |
| 5,787,114 | 7/1998 | Ramamurthy et al. | 375/221 |
| 5,859,669 | 1/1999 | Pretice | 348/469 |
| 5,974,464 | 10/1999 | Shin et al. | 709/231 |

*Primary Examiner*—Stephen Chin
*Assistant Examiner*—Shuwang Liu

[57] ABSTRACT

A transceiver pair is connected by a plurality of high speed serial lines that are tightly integrated into an enhanced communications system. The communications system includes a base transceiver, a remote transceiver, and a plurality of high speed serial lines operably coupled between them. The base transceiver includes a first base input port for receiving parallel data, a plurality of first base output ports for outputting serialized data and a plurality of base serializers operably coupled between the first base input port and the plurality of first base output ports. The plurality of base serializers convert the parallel data into the serialized data. A base input demultiplexer is operably coupled between the first base input port and the plurality of base serializers. A controller is operably coupled between the base input demultiplexer and the base data and clock recovery logic to output control signals to the base input demultiplexer in order to change the operating characteristics of the base input demultiplexer, and thus, the size of the data blocks being transmitted. A timer is operably coupled between the plurality of remote deserializers and the second remote output port for determining the skew among the plurality of remote deserializers. The method for minimizing data skew during transmission over a plurality of data lines comprises first simultaneously transmitting a test pattern over the plurality of data lines and receiving the test pattern. Data skew is measured across the plurality of data sets comprising the test pattern, and an inversing data pattern which minimizes the data skew in the data stream is determined. The inversing data pattern for each of the plurality of data sets is communicated to the demultiplexer.

14 Claims, 3 Drawing Sheets

USING MULTIPLE HIGH SPEED SERIAL LINES TO TRANSMIT HIGH DATA RATES WHILE COMPENSATING FOR OVERALL SKEW

BACKGROUND OF THE INVENTION

1. Field of the Invention

This invention relates to computer systems in general and, more particularly, to a pair of transceiver chips for transmitting serialized data, and receiving and deserializing data at a remote location while simultaneously transmitting serialized feedback control data including control feedback data for modifying the transmission properties of the multiple serial transmission lines between the transceivers.

2. Description of Related Art

As information technology becomes more multimedia intensive, additional bandwidth between remote locations becomes a necessity instead of a luxury. One of the problems well known in the art is that of clock skew which occurs when a clock signal travels long distances by multiple routes. Small variations in the distance of travel lead to a delay in when the clock signals arrive at their respective destinations. A related problem to clock skew is data skew. As data are transmitted at higher frequencies and over longer distances, data bits which should be clocked together become separated in time.

Prior art solutions to the problems of clock skew and data skew include placing strict limits on routing distances and placing tighter limitations on clock pulse generation. Limiting routing distances may include strict quality controls on differential line lengths in cables or signal traces on motherboards, often using "meanders" to lengthen traces which are too short. Clock generation chips may be made to stringent guidelines to ensure a lack of jitter which often propagates into increased skew. Both solutions burden the system with increased expense. It would be desirable to have a system of data transmission which allows for inexpensive control of data skew in high bandwidth data transmissions.

A system is therefore needed which is inexpensive to build yet provides a high bandwidth with a minimum number of data lines, pins and other connections. For ease of integration into legacy systems, this enhanced system should be manufacturable as a single (pair) chip solution, preferably in CMOS (Complementary Metal Oxide Semiconductor) and not more expensive semiconductor technologies such as GaAs (gallium arsenide) or BiCMOS (Bipolar CMOS).

SUMMARY OF THE INVENTION

The problems outlined above are in large part solved by an improved transceiver pair connected by a plurality of high speed serial lines that are tightly integrated into an enhanced communications system. Broadly speaking, the communications system includes a base transceiver, a remote transceiver, and a plurality of high speed serial lines operably coupled between the base and remote transceivers.

The base transceiver includes a first base input port for receiving parallel data, a plurality of first base output ports for outputting serialized data, a plurality of encoders for encoding the data, and a plurality of base serializers operably coupled between the first base input port and the plurality of first base output ports. The plurality of base serializers convert the parallel data into the serialized data after the data have been encoded. In the preferred embodiment, a base input demultiplexer is operably coupled between the first base input port and the plurality of base serializers. The base input demultiplexer demultiplexes the parallel data for input into the plurality of base serializers.

A second base input port may receive a serial data stream from the remote transceiver, and a second base output port may transmit recovered data. A base deserializer may be operably coupled between the second base input port and the second base output port. Base data and clock recovery logic is operably coupled to receive deserialized data from the base deserializer. The base data and clock recovery logic recovers timing and placement information from the deserialized data to form recovered data which may then be output to the base second output port after being decoded by a decoder.

Preferably, a controller is operably coupled between the base input demultiplexer and the base data and clock recovery logic to output control signals to the base input demultiplexer in order to change the operating characteristics of the base input demultiplexer. A base data multiplexer is operably coupled between the controller and the base data and clock recovery logic. The base data multiplexer is configurable to forward the recovered, decoded data to the controller if the recovered, decoded data is controller data, and the base data multiplexer is further configurable to forward the recovered, decoded data to the base second output port if the recovered, decoded data is not controller data. A base clock may be coupled to recover a base clock signal from the serialized data and to synchronize the deserialized data with the base clock signal. The base clock is further coupled to provide a base reference clock signal to one or more of the plurality of base serializers.

The remote transceiver includes a plurality of first remote input ports for receiving the serialized data sent from the base transceiver, a first remote output port for outputting recovered parallel data, and a plurality of remote deserializers operably coupled between the plurality of first remote input ports and the first remote output port. The plurality of remote deserializers convert the serialized data into remote deserialized data. The plurality of remote deserializers are also operable to receive groups of data bits of the serialized data from the plurality of first remote input ports substantially simultaneously. A plurality of remote data and clock recovery logic units are operably coupled to receive the deserialized data from the plurality of remote deserializers. Each of said plurality of remote data and clock recovery logic units recovers timing and placement information from the deserialized data to form recovered parallel data. The plurality of remote data and clock recovery logic units are further operably coupled to output the parallel recovered data to the first remote output port. A remote output multiplexer is operably coupled between the first remote output port and a plurality of remote decoders which decode the data to multiplex the recovered parallel data for output at the first remote output port.

A second remote input port may receive a parallel data stream, and the remote transceiver may then output the parallel data stream at a second remote output port for transmitting the serial data stream after a remote serializer operably coupled between the two ports convert the parallel data stream into the serial data stream. A feedback buffer is also operably coupled between the second remote input port and the remote serializer to accept data to be fed back to the base transceiver. A remote clock is coupled to recover a remote clock signal from the serialized data and to synchronize the deserialized data with the remote clock signal. The remote clock is further coupled to provide a remote reference clock signal to one or more of the plurality of remote serializers. A remote encoder is operably coupled between the serializer and the second remote output port. A timer is preferably operably coupled between the plurality of remote deserializers and the second remote output port for determining the skew among the plurality of remote deserializers.

The transceiver pair are each preferably comprised as monolithic integrated circuits, which are also preferably CMOS integrated circuits. The plurality of high speed serial lines are preferably operably coupled between the plurality of first base output ports and the plurality of first remote input ports, as well as any second base input ports and any second remote output ports.

The method for minimizing data skew during transmission over a plurality of data lines preferably comprises first sending and receiving a preset training pattern simultaneously over the plurality of data lines. Data skew is measured for the training pattern as received, and a "preskew" pattern is communicated to the input demultiplexer. Subsequently, a data stream is demultiplexed into a plurality of data sets using a demultiplexer. Each of the plurality of data sets then contains a set number of data bits, according to the "preskew" pattern. The plurality of data sets are simultaneously transmitted over the plurality of data lines and received. Upon reception, the data sets are properly aligned for deserialization, decoding and multiplexing into the original data stream.

The method for minimizing data skew during transmission over a plurality of data lines may also comprise first sending and receiving a preset training pattern simultaneously over the plurality of data lines. Data skew is measured for the training pattern as received, and the timer directing the data and clock recovery units 125 to align the training pattern, and all subsequent data sets, in alignment buffers for correct reception of the bits. Combinations of these methods may also be used.

BRIEF DESCRIPTION OF THE DRAWINGS

Other objects and advantages of the invention will become apparent upon reading the following detailed description and upon reference to the accompanying drawings in which.

DETAILED DESCRIPTION OF PREFERRED EMBODIMENTS

Figure 1:
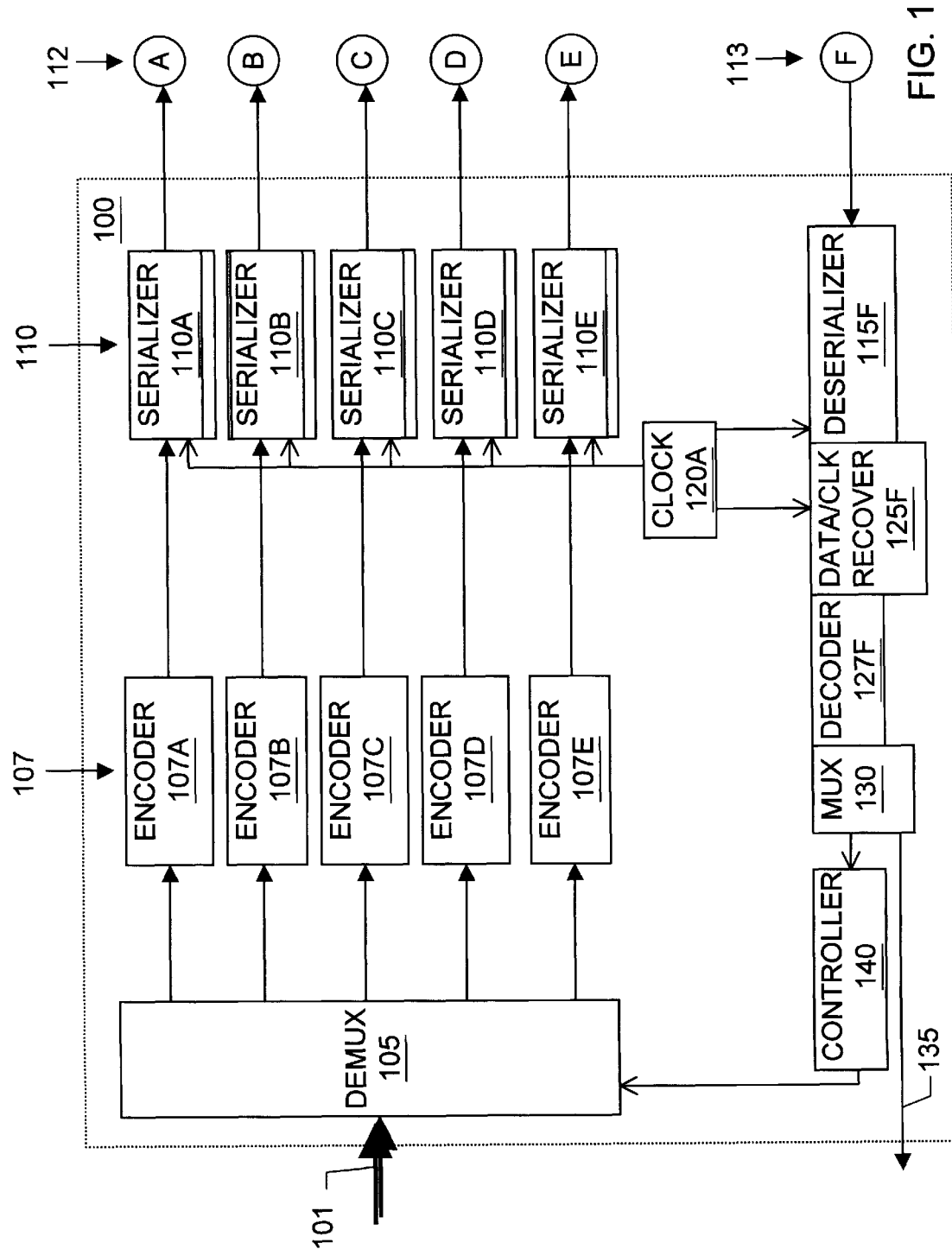
FIG. 1 is a diagram of an enhanced transceiver capable of maintaining a high data rate of transmission while accepting a return data rate according to one embodiment of the present invention.

The use of a letter as part of a number designating a component of a system described in this document will be to show multiple instances of equivalent components. All figures will use a uniform numbering system with identical parts across the figures being given identical numbers. It should be noted that the components of a particular component, such as the base transceiver, may be called "a base component" or just "a component" with the location implying the additional descriptor of "base" as would apply in this example. In the drawings, the use of a solid arrowhead is meant to signify that data are being transmitted either with or without associated control signals. Open arrowheads are meant mainly to signify the passing of control signals.

Turning now to the drawings, FIG. 1 shows a block diagram of an embodiment of a base transceiver chip 100. An input data stream 101, usually although not always in parallel format, is input through a first input port into an input demultiplexer 105. The input data stream 101 is demultiplexed into a plurality of data sets for input into a plurality of serializers 110A. The set number of data bits in each data set is controlled by the input demultiplexer 105. Prior to entering each serializer 110, each data set is individually encoded, using an encoding scheme such as 8B/10B which will be discussed later, at encoder 107. Five encoders 107A–107E and five serializers 110A–110E are shown for illustrative purposes although other numbers are contemplated. The number five was chosen to allow for ample bandwidth between a computer and a monitor, as will be discussed fuirther in relation to FIG. 3.

Clock 120A is coupled to provide a reference clock signal to each of the plurality of serializers 110A for the serialization of each of the respective data sets by the serializers 110. Each serializer 110 outputs a corresponding serial data stream 112 through a plurality of first output ports. The letter designation of each serial data stream 112 refers to the letter designation of the transmitting serializer 110 and a receiving deserializer 115 (shown in FIG. 2). A buffer may also be interposed between the serializer 110 and the output port as desired.

Base transceiver 100 also includes one or more second input ports for accepting a serial data stream 113 which corresponds to an output feedback serial data stream from another transceiver, such as a remote transceiver 200. Only one serial data stream 113F is shown although other numbers are contemplated. The serial data stream 113 is input into a buffer or directly into a deserializer 115F which also accepts a clock 120A input to deserialize the serialized data. The clock inputs a clock signal into data and clock recovery logic 125F which receives the deserialized data from the deserializer 115F.

Figure 2:
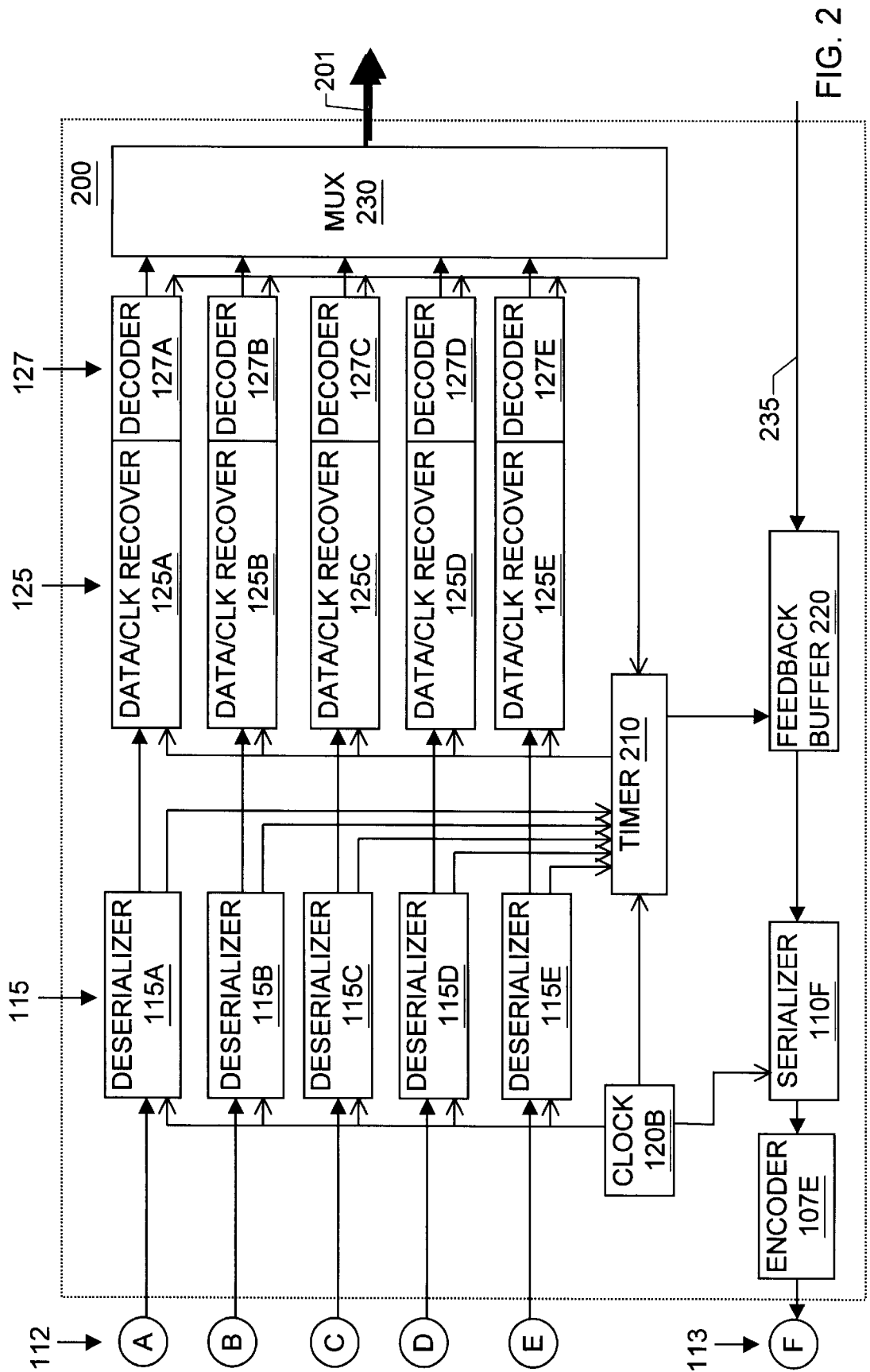
FIG. 2 is a diagram of another enhanced transceiver capable of receiving a high data rate of transmission while sending a return data rate according to another embodiment of the present invention.

Both serializer 110 and deserializer 115 finctions are based on leading-edge Phase-Shifted, Phase Lock Loop (P-S PLL) technology. The base transceiver chip 100, as well as the remote transceiver chip 200 shown in FIG. 2, are full-duplex transceivers that include transmitter and receiver finctions. The base transceiver chip 100 and remote transceiver chip 200 can send and receive data simultaneously since operation of their transmitter and receiver functions are independent.

Using an input reference clock 120A, the transmitter function preferably latches either 10- or 20-bit parallel data 101 and transmits it at a rate up to 1.25-Gbit/sec per output line 112. With 20-bits of data and a 62.5-MHz clock, data 112 are transmitted at 1.25-Gbit/sec per output line 112. Concurrently, the receiver finction deserializes a Gbit/sec data stream 113, recovers a clock (RBC) from the bit stream 125, and outputs 20-bit parallel data 135 at the RBC frequency or 10-bit parallel at twice the RBC frequency.

In one embodiment, the bit stream 101 is transmitted in a non-return to zero (NRZ) format on a low-swing differential pair. From the differential pair, the receiver function accepts the Gbit/sec serial bit stream 112. The receiver function then deserializes the bit stream, recovers the embedded clock, recovers parallel data, optionally aligns data on a selectable sync pattern, and outputs the recovered parallel data either 10- or 20-bits at a time 135. The sync pattern and width of the recovered data are selectable via input signals.

In order to send random data patterns, 8B/10B or similar encoding/decoding scheme is used to dc-balance the bit stream before it is serialized. At extremely high speeds of over a Gbit/sec, the system designer can not afford to have more binary "1"'s than "0"'s or vice versa on the serial line. The number of "1"'s and "0"'s must be about equal. Also, a transition within ten bits must be guaranteed in order for the receiver PLL to stay in lock. The 8B/10B encoding is described in U.S. Pat. No. 4,486,739, titled *Byte Oriented DC Balanced (0, 4) 8B/10B Partitioned Block Transmission Code*, whose inventors were Peter A. Franaszek and Albert X. Widmer, and which was assigned to International Business Machines Corporation, which is hereby incorporated by reference in its entirety. While 8B/10B encoding provides many useful features, such as dc balancing and a guaranteed transition every 5 bits, the only requirement for the chosen encoding scheme is that one transition is guaranteed every 10 bits.

Phase-shift, phase-lock loops (PS-PLL) are used in the clock generators 120 of both the base and receiver. At the base end, the PLL takes in a lower speed system clock and uses several phase shifts to generate a gigahertz clock. Without this advanced PLL design, these speeds could not be achieved in CMOS technology. A PLL guard ring isolates it from other digital logic on the chip and reduces substrate noise. In the receiver, the PS-PLL performs oversampling of the incoming bit streams and recovers data bits reliably.

Data are output from the data and clock recovery logic 125F through a decoder 127F before being input to a data multiplexer which separates control data for the controller 140 from other data 135 which is output from the base transceiver 100 at a second output port. The controller 140 outputs control signals to the input demultiplexer 105 and possibly the serializers 110A–110E to control the operations of the input demultiplexer 105 and possibly the serializers 110A–110E, including the set number of data bits in each of the data blocks transmitted from the base transceiver.

Turning now of FIG. 2, a block diagram of a remote transceiver 200 is shown. A plurality of serial data streams 112A–E are input through a plurality of first input ports to a plurality of deserializers 115A–115E, either directly or through buffers. The deserializers 115 also input a clock signal from clock 120B and output two or more signals to timer 210. The serial input data are deserialized by the deserializers 115A–115E and passed on to a plurality of data and clock recovery logic units 125A–125E. In the plurality of data and clock recovery logic units 125A–125E the clock is recovered for the recovered parallel data. A clock signal is passed to the plurality of data and clock recovery logic units 125A–125E from the clock 120B, shown here as passing through the timer 210. An output multiplexer 230 is operably coupled between the plurality of data and clock recovery logic units 125A–125E and a first output port, with the data being decoded by decoders 127A–127E prior to entering the output multiplexer 230. The multiplexer 230 outputs recovered parallel data 201 through the first output port.

The timer 210 receives a reference clock signal from the clock 120B. The timer 210 also receives at least the starting and ending time for receiving a data set. The timer 210 times the receiving of the data sets and measures the data skew across the plurality of serial lines. The skew data is then forwarded to the feedback buffer 220 or serializer 110F to feed back this control information to the controller 140 in order to minimize the data skew in the system. The feedback buffer 220 also receives a parallel data stream 235 from a second input port. The parallel data stream 235 and the skew data are sent to a serializer 110F which serializes the combined feedback data, using a clock signal from clock 120B, for output, after being encoded by encoder 107E, as a serial data stream 113F to another transceiver, such as the base transceiver 100.

Figure 3:
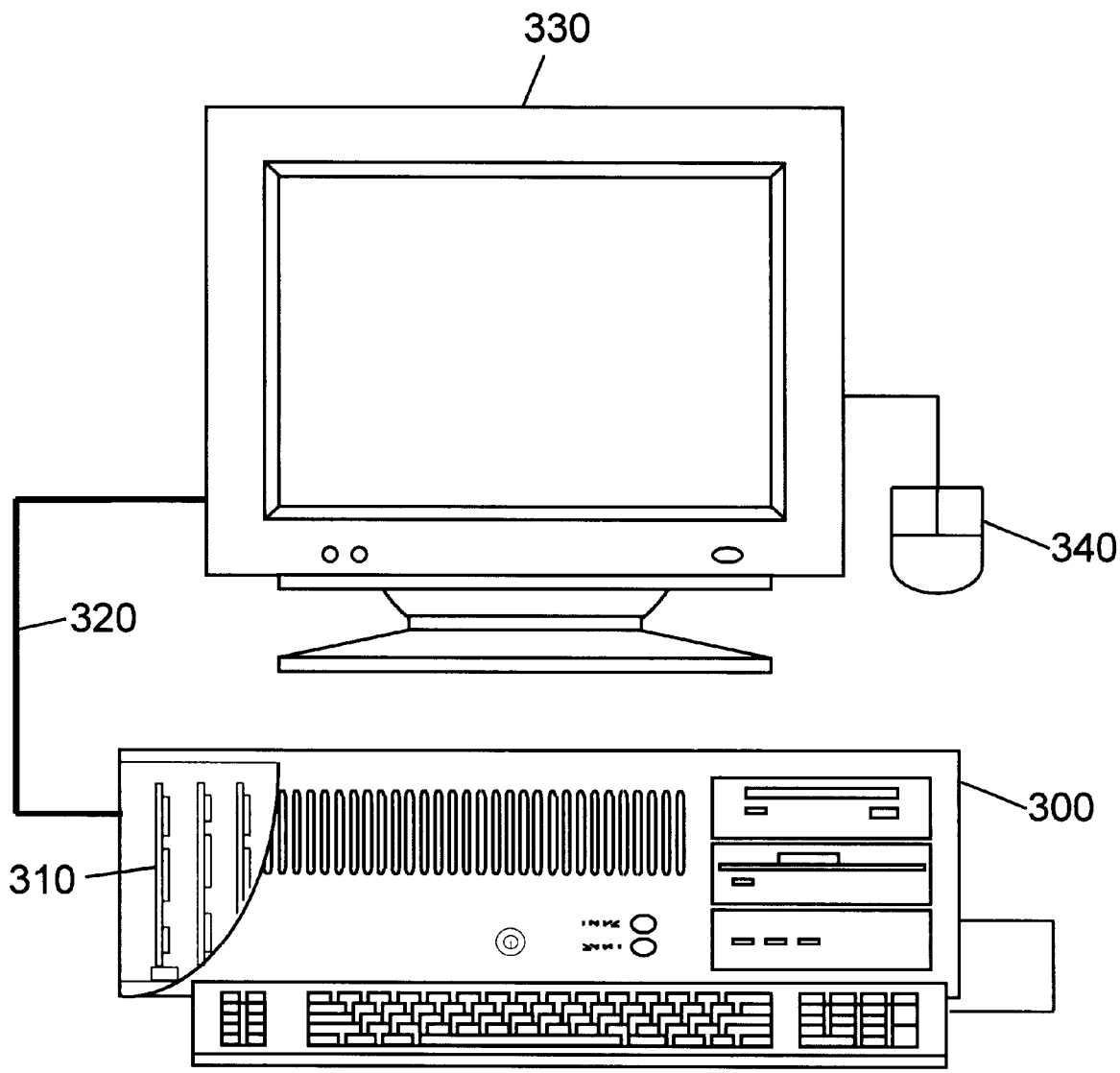
FIG. 3 is close-up and cut-away view of a server computer having the enhanced transceivers in FIG. 1 and FIG. 2 according to an embodiment of the present invention.

Finally, FIG. 3 shows computer 300 with a standard keyboard. An enhanced input/output (I/O) card 310 is shown through a cut-away as being present in computer 300. The enhanced I/O card 310 is coupled in the rear (not shown) to the high speed serial line 320 which transmits audio, video, control and feedback data to and from the computer 300 and the monitor 330. Attached to monitor 120A is a mouse 340 as an embodiment of a feedback sensor.

Enhanced I/O card 310 and monitor 330 each include an advanced transceiver, a base transceiver on enhanced I/O card 310 and a remote transceiver in monitor 330. High speed serial connection 320 between the base transceiver the remote transceiver provides the serial data transfer including audio, video and control data from the enhanced I/O card 310 to the monitor 330 and feedback data or control data from the sensor 340 to the computer 300. Additional details concerning the transceivers have been given above with respect to FIG. 1 and FIG. 2.

The choice for five high speed serial lines between the base transceiver 100 and the remote transceiver 200 is based on the required bandwidth to transmit 1600×1200 video stream at 24 bit color resolution to meet a 72 Hz refresh rate across serial lines capable of 1.25 GHz data transmission. In order not to overload the lines by transmitting at the maximum capacity and to leave room for load growth, a 50% duty factor leads to a need for a minimum of five serial lines.

A method for minimizing data skew during transmission over a plurality of data lines is also given. The steps which comprises the method may include, ordered as desired, transmitting a training pattern over a plurality of data lines as a plurality of data sets and receiving the training pattern. The data skew is measured across, between or among the plurality of data sets. A "preskew" pattern is determined which when integrated into the training pattern results in the training pattern being received properly when retransmitted. The preskew pattern is communicated to the transmitter and integrated into all subsequent data sets before transmission.

An input data stream is preferably composed of parallel data but may also be in another data format. Any device which may act as a demultiplexer may also be used. Each of the plurality of data sets is to contain a set number of data bits. This set number may be a nibble, byte, word, dword, or other size as desired. Other quantities other than the need to minimize skew may be taken into account in choosing the size of the set number.

Each data set is simultaneously transmitted over the plurality of data lines and received. A dynamic and/or constant readjustment may also be made for the transmission of each separate data set. An out- of bounds character, for example, from the encoding scheme may be used to signal a new training pattern test. New training pattern tests may be initiated after a fixed number of transmissions or upon power-on only. Other criteria may also be used to determine when to send a new training pattern transmission.

Another method for compensating for data skew involves "unskewing" the data after transmission and reception by using alignment buffers in the data and clock recovery units 125. The timer 210 could direct the data and clock recovery units 125 to align the training pattern, and all subsequent data sets, in alignment buffers for correct reception of the bits. This method has the advantage of not using the feed back channel 113.

A combination of the two methods is also contemplated where the power-on training pattern test uses the feedback "preskew" method, and each training pattern test after the power-on test causes the alignment buffers to be shifted, but only if necessary. Other combinations of these methods and similar methods are also contemplated.

It will be appreciated to those skilled in the art having the benefit of this disclosure that this invention is believed to be to a pair of transceiver chips capable of transmitting serialized data, and receiving and deserializing data at a remote location while simultaneously transmitting serialized feedback control data including control feedback data for modifying the transmission properties of the multiple serial transmission lines between the transceivers. It is intended that the following claims be interpreted to embrace all such modifications and changes and, accordingly, the specification and drawings are to be regarded in an illustrative rather than a restrictive sense.

What is claimed is:

1. A transceiver, comprising:
   a first input port for receiving parallel data;
   a demultiplexer and a plurality of serializers operably coupled to dispatch said parallel data as multiple data streams among a respective multiple set of first output ports;
   a controller coupled to the demultiplexer to offset a timing skew between the multiple data streams; and
   a receiver comprising a second input port for receiving a feedback signal indicative of said timing skew.

2. The transceiver as recited in claim 1, wherein said timing skew comprises dissimilar times at which the multiple data streams are received by a receiver distally coupled to the transceiver.

3. The transceiver as recited in claim 1, wherein the multiple data streams are forwarded at a rate exceeding 1.0 gigabit per second across each of a respective multiple set of serial lines.

4. The transceiver as recited in claim 1, further comprising:
   a deserializer operably coupled between said second input port and said controller; and
   data and clock recovery logic operably coupled to the deserializer for recovering timing information as to dissimilarities between times in which the multiple data streams are received by the receiver and for inputting the timing information into the controller.

5. The transceiver of claim 4, wherein said transceiver is a monolithic integrated circuit.

6. The transceiver of claim 5, wherein said monolithic integrated circuit is a CMOS integrated circuit.

7. The transceiver as recited in claim 4, further comprising:
   a clock coupled to recover a clock signal from serialized data constituting said feedback signal and to synchronize said deserialized data from said deserializer with said clock signal, wherein said clock is further coupled to provide a reference clock signal to one or more of said plurality of serializers.

8. A transceiver, comprising:
   a receiver comprising a plurality of first input ports for receiving serialized data, a first output port for outputting parallel data and a plurality of deserializers operably coupled between said plurality of first input ports and said first output port, wherein said plurality of deserializers convert said serialized data into deserialized data;
   a transmitter comprising a second input port for receiving a parallel data stream and a second output port for transitting serial feedback data;
   a serializer operably coupled between said second input port and said second output port; and
   a feedback buffer operably coupled between said second input port and the serializer to receive a parallel data stream.

9. The transceiver as recited in claim 8, further comprising:
   a clock coupled to recover a clock signal from said serialized data and to synchronize said deserialized data with said clock signal, wherein said clock is further coupled to provide a reference clock signal to one or more of said plurality of serializers.

10. The transceiver as recited in claim 9, wherein said plurality of deserializers are operable to receive groups of data bits of said serialized data from said plurality of first input ports substantially simultaneously.

11. The transceiver as recited in claim 9, further comprising:
    a timer operably coupled between the plurality of deserializers and the second output port for determining the skew among the plurality of deserializers.

12. The transceiver as recited in claim 9, further comprising:
    one or more additional second input ports; and
    one or more additional serializers operably coupled between selected ones of said one or more additional second input ports and said second output port.

13. The transceiver as recited in claim 12, further comprising:
    a data demultiplexer operably coupled between said one or more additional second input ports and said one or more additional serializers for demultiplexing said feedback data for serial transmission through a plurality of high speed serial connections.

14. A high speed serial communications system, comprising:
    A base transceiver, including:
       a first base input port for receiving parallel data;
       a plurality of first base output ports for outputting serialized data;
       a plurality of base serializers operably coupled between said first base input port and said plurality of first base output ports, wherein said plurality of base serializers convert said parallel data into said serialized data;
       a base input demultiplexer operably coupled between said first base input port and said plurality of base serializers, wherein said base input demultiplexer demultiplexes said parallel data for input into said plurality of base serializers;
       a second base input port for receiving a serial data stream;
       a second base output port for transmitting recovered data
       a base deserializer operably coupled between said second base input port; and said second base output port;
       base data and clock recovery logic operably coupled to receive deserialized data from said base deserializer, wherein said base data and clock recovery logic recovers timing and placement information from said deserialized data to form recovered data, wherein said base data and clock recovery logic are further operably coupled to output said recovered data to said base second output port;

a controller operably coupled between said base input demultiplexer and said base data and clock recovery logic, wherein said controller is configurable to output control signals to said base input demultiplexer to change the operating characteristics of said base input demultiplexer;

a base data demultiplexer operably coupled between said controller and said base data and clock recovery logic, wherein said base data demultiplexer is configurable to forward said recovered data to said controller if said recovered data is controller data, wherein said base data demultiplexer is further configurable to forward said recovered data to said base second output port if said recovered data is not controller data; and a base clock coupled to recover a base clock signal from said serialized data and to synchronize said deserialized data with said base clock signal, wherein said base clock is further coupled to provide a base reference clock signal to one or more of said plurality of base serializers;

a remote transceiver, including:
a plurality of first remote input ports for receiving said serialized data;
a first remote output port for outputting recovered parallel data;
a plurality of remote deserializers operably coupled between said plurality of first remote input ports and said first remote output port, wherein said plurality of remote deserializers convert said serialized data into remote deserialized data; wherein said plurality of remote deserializers are operable to receive groups of data bits of said serialized data from said plurality of first remote input ports substantially simultaneously;
a plurality of remote data and clock recovery logic units operably coupled to receive said deserialized data from said plurality of remote deserializers, wherein each of said plurality of remote data and clock recovery logic recovers timing and placement information from said deserialized data to form recovered parallel data, wherein said plurality of remote data and clock recovery logic units are further operably coupled to output said parallel recovered data to said first remote output port;
a remote output multiplexer operably coupled between said first remote output port and said plurality of remote serializers, wherein said remote output multiplexer multiplexes said recovered parallel data for output at said first remote output port;
a second remote input port for receiving a parallel data stream;
a second remote output port for transmitting said serial data stream;
a remote serializer operably coupled between said second remote input port and said second remote output port;
a feedback buffer operably coupled between said second remote input port and the remote serializer;
a remote clock coupled to recover a remote clock signal from said serialized data and to synchronize said deserialized data with said remote clock signal, wherein said remote clock is further coupled to provide a remote reference clock signal to one or more of said plurality of remote serializers; and
a timer operably coupled between the plurality of remote deserializers and the second remote output port for determining the skew among the plurality of remote deserializers; and a plurality of high speed serial lines operably coupled between said plurality of first base output ports and said plurality of first remote input ports.

* * * * *